United States Patent
Ramsey et al.

[11] 3,932,761
[45] Jan. 13, 1976

[54] FIBER COUPLED LIGHT EMITTING DIODE MODULE

[75] Inventors: Hubert J. Ramsey, Burlington; Samuel M. Stone, Lynnfield; Joseph Zucker, Waban, all of Mass.

[73] Assignee: GTE Laboratories, Incorporated, Waltham, Mass.

[22] Filed: Nov. 18, 1974

[21] Appl. No.: 524,695

[52] U.S. Cl. .............................................. 250/552
[51] Int. Cl.² ........................................... H01L 9/00
[58] Field of Search ...... 250/227, 551, 552; 357/17; 350/96 C

[56] References Cited
UNITED STATES PATENTS

| | | |
|---|---|---|
| 3,792,284 | 2/1974 | Kaelin .......................... 250/522 X |
| 3,842,262 | 10/1974 | Heitman et al. ................ 250/522 X |

Primary Examiner—Davis L. Willis
Attorney, Agent, or Firm—Irving M. Kriegsman; Bernard L. Sweeney

[57] ABSTRACT

A fiber coupled light emitting diode module is provided which may be utilized for plug-in incorporation into a fiber optical communications system and for easy connection to a driving voltage source. Means are included in the module for facilitating manufacture since the location of the light emitting diode is not critical within the device and the device may be operated efficiently since the heat which is generated at the light emitting diode is conducted away to the exterior of the module for dissipation.

8 Claims, 2 Drawing Figures

FIBER COUPLED LIGHT EMITTING DIODE MODULE

BACKGROUND OF THE INVENTION

The present invention relates generally to fiber optical communications systems and is more particularly concerned with a fiber coupled light emitting diode module for incorporation into such systems.

A recent development in communications systems involves the use of optical fibers for communication channels sometimes having very high bandwidth. The use of such optical fibers, which carry light energy distributed over an area, has led to a need for light sources which can be conveniently and efficiently coupled into such an optical fiber communications system. One of the difficulties encountered in accomplishing this end is directly attributable to the small cross-sectional dimensions of the light-carrying portions of typical optical fibers utilized.

A number of light sources have been suggested for use in such, optical fiber communications systems including various lasers and light emitting diodes. The light emitting diode is an excellent candidate for such a purpose because of its small size and relatively efficient operation. Although numerous suggestions may be found in the art for the use of light emitting diodes in such systems, these devices are not readily incorporable into actual systems.

SUMMARY OF THE INVENTION

Accordingly, it is an object of the present invention to provide a light emitting diode source for fiber optical communications systems which is housed in modular form for plug-in incorporation.

It is another object of the present invention to provide such a modular form of light emitting diode which has means incorporated therein for conducting heat generated at the light emitting diode away from the diode so that operation of the device may be at the highest possible power consistent with a reasonable lifetime for the device.

It is another object of the present invention to provide such a modular unit which includes means for directly indexing the output of the light emitting diode into the fiber optical communications system.

It is still a further object of the present invention to provide such a novel light emitting diode module to a suitable source of driving voltage.

Briefly, the invention in its broadest aspect is a fiber coupled light emitting diode module. The module has a generally cylindrical, electrically conductive center support element. A light emitting diode is electrically, thermally and mechanically connected at its base to a first end surface of the support element. A length of optical fiber is optically coupled and mechanically affixed to the emitting area of the light emitting diode and extends generally axially away from the support element. An adapter element which is formed from an electrically conductive material has a generally axial through bore therein and an external surface to which accurate position indexing of the module may be made. The support element is positioned in one end of the through bore and is electrically insulated from and thermally connected to the adapter element. The optical fiber exits from the other end of the through bore. An inner cylindrical sleeve is provided which has a generally axial through bore therethrough sized to enable the end of the optical fiber exiting from the adapter element to be fixedly adhered therein with the optical fiber positioned generally parallel with sleeve axis. The inner sleeve is positioned in and affixed to the end portion of the through bore in the adapter element so that the end of the optical fiber is located in a known relationship relative to the external surface so that efficient optical coupling may be accomplished to another optical fiber. Means are provided for electrically connecting the other electrode of the light emitting diode to the adapter element. Finally, means are provided for connecting the center support center and the adapter element to a suitable voltage source so that a voltage may be impressed across the light emitting diode whereby the light emitting diode module may be easily coupled to an optical fiber and operated efficiently as the heat generated is conducted away from the light emitting diode.

These and other objects, advantages and features of the invention will be apparent from the following detailed description of the preferred embodiment taken together with the accompanying drawing.

DETAILED DESCRIPTION OF THE PREFERRED EMBODIMENTS

Figure 2:
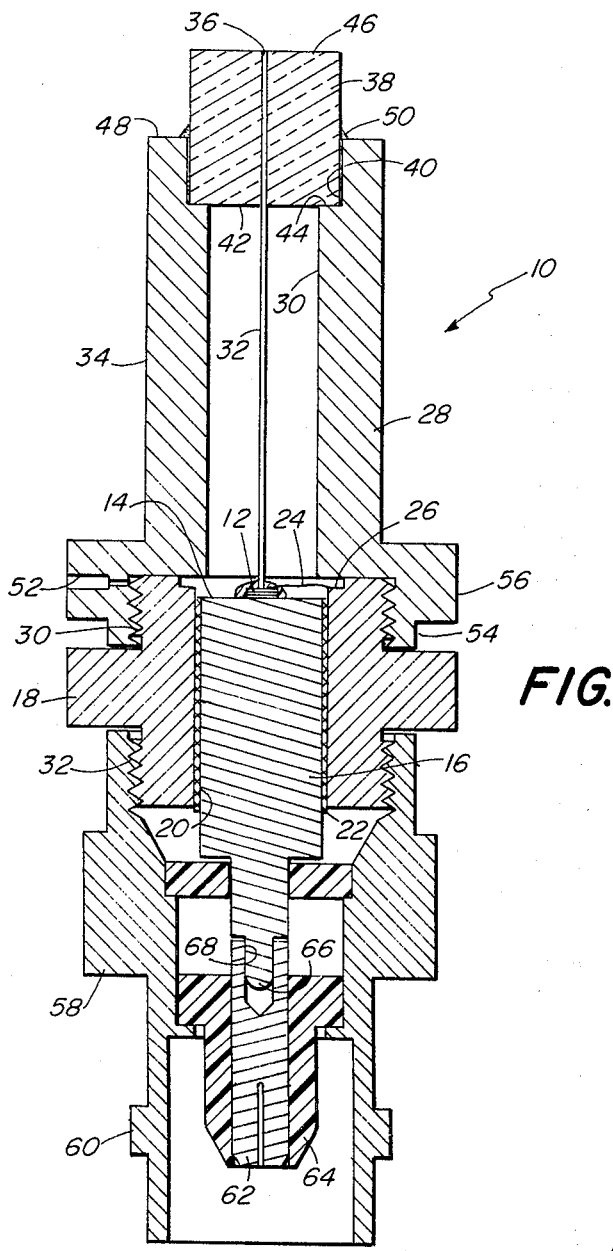
FIG. 2 is an enlarged longitudinal cross-sectional view of the fiber coupled light emitting diode module shown in FIG. 1.
Figure 1:
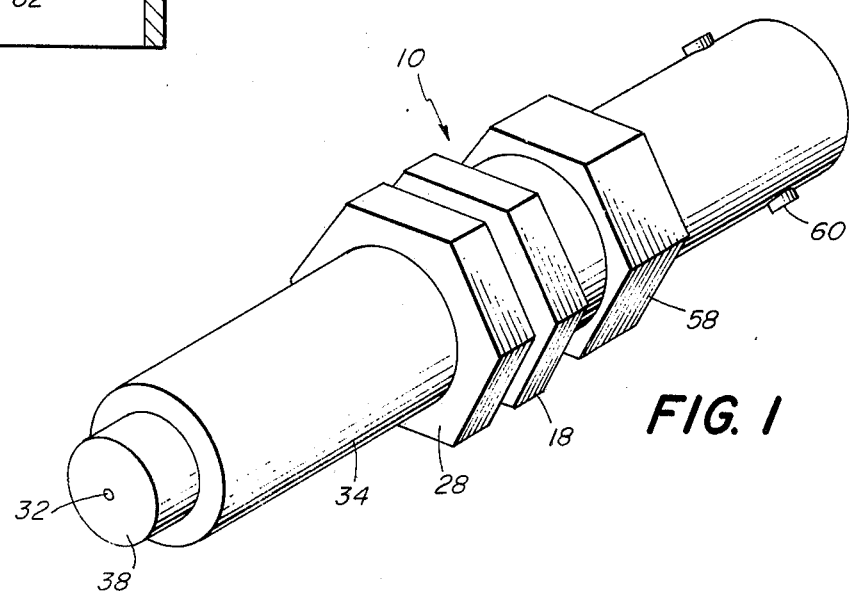
FIG. 1 is an isometric view of a preferred embodiment of the fiber coupled light emitting diode module according to the present invention.

In referring to the various figures of the drawing hereinbelow, like reference numerals will be utilized in referring to identical parts of the apparatus.

Referring now to the drawing, there is shown a preferred embodiment of a fiber coupled light emitting diode module according to the present invention which is designated generally by the reference numeral 10. In this embodiment, a light emitting diode 12 is mounted to the top surface 14 of a center support element 16. Either a metallic pedestal mount or a type IIA diamond mount may be used. For reasons which will be more fully apparent hereinbelow, the light emitting diode 12 is electrically, thermally and mechanically connected to the surface 14. The center support element 16 is formed of a thermally and electrically conductive material. The center support element 16 is attached physically within a primary adapter body 18 by cementing the center support element within a through bore 20 by means of a suitable cement 22. The cement to be utilized at this point in the apparatus is a thermally conductive, electrically insulating cement. Many such cements are commercially available and may be cured at either elevated temperatures or at room temperature. A specific commercial example satisfying these requirements and which has been used successfully is that manufactured by Epo-TEC Manufacturing Company under the designation H-72 type epoxy. As a result of this form of mounting, a relatively short heat flow path is established from the light emitting diode 12 to the exterior of the primary adapter body 18 via the thermally conducting cement 22. The establishment of this heat flow path allows the light emitting diode to be operated continuously and at optimal efficiency whereas without such a provision, the heat generated at the light emitting diode might prevent continuous use thereof and, at a minimum, the operating efficiency and/or operating life would be deleteriously affected.

The other electrode of the light emitting diode 12 is connected electrically to the primary adapter body 18 which forms the outer conductor of a coaxial construction via a suitable means of connection 24 such as a wire of gold or aluminum. The wire 24 may be attached to a recessed shoulder 26 on the primary adapter body 18.

Additionally, primary adapter body 18 has a means thereon such as a pair of opposed flats or a hexagonal form by which primary adapter body 18 may be held during assembly to some of the reamaining parts of the module 10. The primary adapter body 18 also includes a pair of threaded shank portions 30 and 32 to which other parts to be described below of the adapter module 10 are attached.

On the upper end of the primary adapter body 18 is mounted a means for coupling the light energy emitted by the light emitting diode 12 into an optical fiber system. An optical fiber aligning member 28 is disposed on the upper end of the primary adapter body 18. The member 28 has a generally axial through bore 30 therein through which a length of optical fiber 32 passes from the light emitting diode 12 to the exterior of the member 28. The member 28 has an external surface 34 thereon which may be utilized for indexing the location of the end of the optical fiber 32 so that efficient optical coupling may be achieved to a fiber optical communications system. in the preferred embodiment, the surface 34 is circularly cylindrical and may be utilized to couple the output from the light emitting diode via an optical fiber coupler such as shown in copending United States patent application Ser. No. 498,803 which is also assigned to the assignee of the present invention.

The light emitting diode 12 may be of any standard form; however, the presently preferred form thereof is of a type in which the emitting area of the diode is restricted to a size such that a maximum amount of light may be collected for transmission by the length of optical fiber 32 to be utilized therewith. An example of such a light emitting diode is shown in an article entitled "Efficient Small-Area Ga As-Ga$_{1-x}$ Al$_x$ As Heterostructure Electroluminescent Diodes Coupled To Optical Fibers," by Burrus et al., *Proceedings of the IEEE (Letters)*, Vol. 59, pp. 1263-4, August 1971.

The bottom end of the optical fiber 32 is bonded to the light emitting diode 12 with a suitable optical cement. The other end of the length of optical fiber 32 is affixed in a through bore 36 of an inner rigid sleeve 38. The sleeve 38 is of generally circularly cylindrical form and is disposed in an enlarged portion 40 of the through bore in the aligning member 28. The cylindrical inner sleeve 38 has its bottom surface 42 disposed in contact with a shoulder 44 at the end of the enlarged portion 40 of the bore 30. The bore 36 in the sleeve is sized to enable the end portion of the length of optical fiber 32 exiting through the aligning member 28 to be fixedly adhered therein with a suitable cement. In addition, it is preferable that the bore 36 be sufficiently close in diameter to the diameter of the optical fiber 32 so that while the optical fiber 32 may lie along a wall of the bore 36 that it is oriented essentially parallel to the axis of the bore 36, yet space for the cement is present. The length of the inner sleeve 38 is preferably such that the end of the optical fiber which is terminated essentially at the upper surface 46 of the inner sleeve 38 protrudes from the upper surface 48 of the member 28. In this manner, the terminating end of the optical fiber 32 may be brought into close proximity with a mating optical fiber in the aforementioned coupler for efficient optical coupling. The end of the optical fiber 32 at the surface 46 is positioned in a known relationship relative to the surface 34 on the aligning member 28 for indexing purposes. Once this relationship is established, a suitable fast drying cement 50 is utilized to bond the inner sleeve 38 securely to the member 28. That relationship may, depending on the application, be, in the case where the external surface 34 is a circularly cylindrical surface, either coaxial or slightly eccentric. In the presently preferred embodiment, the end surface 46 of the inner sleeve is ground and polshed normal to the axis to allow a maximum percentage of the light generated in the module 10 to be transmitted out of the module.

The aligning member 28 is attached to the upper threaded shank portion 30 of the primary adapter body 18 through a threaded collar portion 54 on which a set of flats 56 or other means of securely holding the aligning member 28 are found. In addition, an opening 52 is provided in the aligning member 28 so that venting of the contained gas volume may be had during assembly and use of the device.

The foregoing arrangement of the light emitting diode 12 and the length of optical fiber 32 is such that a large portion of the length of optical fiber 32 is unsupported laterally. This is beneficial in the device since the precise location of the light emitting diode 12 on the upper surface 14 of the center support element 16 is not at all critical. The inherent flexibility of the optical fiber 32 allows for the positioning of the light emitting diode 12 at any point on the surface 14 while yet allowing the exiting end of the optical fiber 32 to be positioned precisely with respect to the indexing external surface 34. This provision greatly facilitates the manufacture and assembly of the fiber coupled light emitting diode module 10.

Although the foregoing description has utilized a pair of threadedly mating members, the primary adapter body 18 and and optical fiber aligning member 28, it is within the purview of the invention that only a single adapter element may be substituted for these two members and yet perform the total function accomplished by these two members in the preferred embodiment.

A connector body member 58 is attached to the lower threaded shank portion 32 of the primary adapter body 18. The member 58 is essentially a conversion member from the primary adapter body 18 to a standard coaxial outer conductor member, such as a BNC coaxial connector. The member 58 has a center conductor 62 which mates with the center support element 16 and is disposed within an insulator 64. The insulator 64 is pressed into position within the member 58. The center conductor 62, in this embodiment, mates with a reduced diameter appendage 66 of the center support element 16. This appendage 66 is pressed into place in a bore 68 in the upper end of the center conductor 62. A second insulator serves to partially support and to align these members. In this manner, connection may be made between a standard coaxial cable and connector and the module 10 so that a driving voltage may be imposed across the light emitting diode 12.

It may thus be seen that a fiber coupled light emitting diode module is provided which is simple in its construction and readily lends itself to modern manufacturing techniques. The device is insertable readily into a operational fiber optical system and utilizes only standard interfacial connections. Furthermore, continuous highly efficient operation of the device is attainable without resort to special cooling techniques because of the short heat flow path provided by the module to conduct heat away from the light emitting diode 12.

While there has been shown and described what is presently considered to be a preferred embodiment of the invention, it will be obvious to one ordinarily skilled in the art that various changes and modifications may be made therein without departing from the spirit of the invention as defined by the appended claims.

We claim:

1. A fiber coupled light emitting diode module comprising
    a generally cylindrical, electrically conductive center support element,
    a light emitting diode having two electrodes and being electrically, thermally and mechanically connected at its base electrode to a first end surface of the support element,
    a length of optical fiber optically coupled and mechanically affixed to the emitting area of the light emitting diode and extending generally axially away from the support element,
    an adapter element formed of an electrically conductive material and having a generally axial through bore therein and an external surface to which accurate position indexing of the module may be made, the support element being positioned in one end of the through bore and being electrically insulated from and thermally connected to the adapter element, the optical fiber exiting from the other end of the through bore,
    an inner rigid cylindrical sleeve having a generally axial bore therethrough sized to enable the end of the optical fiber exiting from the adapter element to be fixedly adhered therein with the optical fiber positioned generally parallel to the sleeve axis, the inner sleeve being positioned in and affixed to the end portion of the through bore in the adapter element so that the end of the optical fiber is located in a known relationship relative to the external surface so that efficient optical coupling may be accomplished to another optical fiber,
    means for electrically connecting the other electrode of the light emitting diode to the adapter element, and
    means for connecting the center support element and the adapter element to a suitable voltage source so that a voltage may be impressed across the light emitting diode whereby the light emitting diode module may be easily coupled into an optical fiber and operated efficiently as the heat generated is conducted away from the light emitting diode.

2. A fiber coupled light emitting diode module according to claim 1, wherein the means for connecting the center support and adapter elements to a suitable voltage source is a coaxial connector, the outer conductor of which is attached to the adapter element and the center conductor of which is attached to the center support element.

3. A fiber coupled light emitting diode module according to claim 2, wherein a major portion of the length of optical fiber is suspended between the light emitting diode and the inner sleeve.

4. A fiber coupled light emitting diode module according to claim 3, wherein a thermally conductive cement is interposed between the adapter element and the center support element.

5. A fiber coupled light emitting diode module according to claim 4, wherein the external surface of the adapter element is a right circular cylindrical surface.

6. A fiber coupled light emitting diode module according to claim 5, wherein the inner sleeve is nested in an enlarged portion of the bore of the adapter element and protrudes therefrom, the optical fiber terminating essentially at the exposed end surface of the inner sleeve.

7. A fiber coupled light emitting diode module according to claim 6, wherein the optical fiber terminates essentially on the axis of the external surface.

8. A fiber coupled light emitting diode module according to claim 7, wherein the means for electrically connecting the top surface of the light emitting diode to the adapter element is a length of gold wire.

* * * * *

UNITED STATES PATENT OFFICE
CERTIFICATE OF CORRECTION

Patent No. 3,932,761  Dated January 13, 1976

Inventor(s) Hubert J. Ramsey, Samuel M. Stone and Joseph Zucker

It is certified that error appears in the above-identified patent and that said Letters Patent are hereby corrected as shown below:

Column 2, line 12, delete the second occurrence of "center" and insert therefor --element--

Column 3, line 14, delete "reamaining" and insert therefor --remaining--

Column 4, line 16, delete "polshed" and insert therefor --polished--

Column 5, line 3, delete "a" and insert therefor --an--

Signed and Sealed this twentieth Day of April 1976

[SEAL]

Attest:

RUTH C. MASON
Attesting Officer

C. MARSHALL DANN
Commissioner of Patents and Trademarks